(12) United States Patent
Kandala

(10) Patent No.: US 7,330,877 B2
(45) Date of Patent: Feb. 12, 2008

(54) DEVICES, SOFTWARES AND METHODS FOR RESCHEDULING MULTI-PARTY SESSIONS UPON PREMATURE TERMINATION OF SESSION

(75) Inventor: Srinivas Kandala, Vancouver, WA (US)

(73) Assignee: Sharp Laboratories of America, Camas, WA (US)

( * ) Notice: Subject to any disclaimer, the term of this patent is extended or adjusted under 35 U.S.C. 154(b) by 798 days.

(21) Appl. No.: 09/823,511

(22) Filed: Mar. 30, 2001

(65) Prior Publication Data

US 2002/0143982 A1 Oct. 3, 2002

Related U.S. Application Data

(60) Provisional application No. 60/233,363, filed on Sep. 18, 2000.

(51) Int. Cl.
*G06F 15/16* (2006.01)
*G06F 15/173* (2006.01)

(52) U.S. Cl. .................. 709/206; 709/207; 709/232; 709/236

(58) Field of Classification Search ........... 709/232, 709/236, 234, 206, 207; 710/15, 263, 20, 710/52; 705/9; 718/100; 370/346, 336, 370/458; 455/434, 447, 450, 456
See application file for complete search history.

(56) References Cited

U.S. PATENT DOCUMENTS

| 5,297,144 | A | * | 3/1994 | Gilbert et al. ............ 370/346 |
| 5,502,724 | A | * | 3/1996 | Chen et al. .............. 370/445 |
| 5,506,848 | A | * | 4/1996 | Drakopoulos et al. ..... 370/336 |
| 5,594,720 | A | * | 1/1997 | Papadopoulos et al. ... 370/330 |
| 5,719,868 | A | * | 2/1998 | Young ..................... 370/436 |
| 5,729,540 | A | * | 3/1998 | Wegrzyn ................. 370/336 |
| 5,790,535 | A | * | 8/1998 | Kou ....................... 370/337 |
| 5,881,296 | A | * | 3/1999 | Williams et al. ......... 710/263 |
| 5,890,134 | A | * | 3/1999 | Fox ........................ 705/9 |
| 5,909,594 | A | * | 6/1999 | Ross et al. .............. 710/20 |
| 5,918,074 | A | * | 6/1999 | Wright et al. ........... 710/52 |
| 5,941,952 | A | * | 8/1999 | Thomas et al. .......... 709/234 |
| 5,953,344 | A | * | 9/1999 | Dail et al. ............... 370/443 |
| 6,003,061 | A | * | 12/1999 | Jones et al. ............. 718/104 |
| 6,052,562 | A | * | 4/2000 | Dorenbosch ............. 340/7.42 |
| 6,069,885 | A | * | 5/2000 | Fong et al. .............. 370/336 |
| 6,094,426 | A | * | 7/2000 | Honkasalo et al. ....... 370/331 |
| 6,167,379 | A | * | 12/2000 | Dean et al. .............. 705/9 |

(Continued)

FOREIGN PATENT DOCUMENTS

EP 0 483 546 A1 5/1992

OTHER PUBLICATIONS

AT&T, Lucent, ShareWave, *IEEE 802.11 QoS MAC Enhancements, Joint Proposal*, May 2000, Slide 1-50.

(Continued)

*Primary Examiner*—William Vaughn
*Assistant Examiner*—Kristie Shingles
(74) *Attorney, Agent, or Firm*—Stolowitz Ford Cowger LLP

(57) ABSTRACT

Devices, softwares and methods reschedule multi-party sessions upon premature termination of a wireless communication session. Upon sensing a premature termination, an access point transmits a rescheduling frame. All sessions are advanced in time, which saves time in the end, without leaving quiet times. In addition, the invention avoids a hidden node problem.

15 Claims, 7 Drawing Sheets

U.S. PATENT DOCUMENTS

| | | | |
|---|---|---|---|
| 6,226,263 B1 * | 5/2001 | Iwase et al. | 370/231 |
| 6,307,846 B1 * | 10/2001 | Willey | 370/329 |
| 6,317,234 B1 * | 11/2001 | Quayle | 398/9 |
| 6,332,153 B1 * | 12/2001 | Cohen | 709/204 |
| 6,363,062 B1 * | 3/2002 | Aaronson et al. | 370/348 |
| 6,374,103 B1 * | 4/2002 | Kamel et al. | 455/434 |
| 6,400,699 B1 * | 6/2002 | Airy et al. | 370/329 |
| 6,438,110 B1 * | 8/2002 | Rai et al. | 370/254 |
| 6,512,928 B1 * | 1/2003 | Janky et al. | 455/456.6 |
| 6,529,497 B1 * | 3/2003 | Hjelm et al. | 370/347 |
| 6,584,489 B1 * | 6/2003 | Jones et al. | 718/104 |
| 6,600,754 B1 * | 7/2003 | Young et al. | 370/459 |
| 6,631,394 B1 * | 10/2003 | Ronkka et al. | 718/100 |
| 6,735,641 B1 * | 5/2004 | Kobayashi et al. | 710/15 |
| 6,788,702 B1 * | 9/2004 | Garcia-Luna-Aceves et al. | 370/458 |
| 6,850,489 B1 * | 2/2005 | Omi et al. | 370/230 |
| 6,885,868 B1 * | 4/2005 | Naim et al. | 455/452.1 |
| 6,891,835 B2 * | 5/2005 | Kalkunte et al. | 370/395.41 |
| 6,956,834 B2 * | 10/2005 | Stanwood et al. | 370/329 |
| 6,965,607 B1 * | 11/2005 | Landberg et al. | 370/442 |
| 6,970,422 B1 * | 11/2005 | Ho et al. | 370/230 |
| 7,039,032 B1 * | 5/2006 | Ho et al. | 370/338 |
| 7,068,632 B1 * | 6/2006 | Ho et al. | 370/338 |
| 7,068,633 B1 * | 6/2006 | Ho | 370/338 |
| 2002/0046381 A1 * | 4/2002 | Morris et al. | 714/752 |

OTHER PUBLICATIONS

*Information Technology—Telecommunications and Information Exchange Between System s—Local and Metropolitan Area Networks—Specific Requirements; Part 11: Wireless LAN Medium Access Control (MAC) and Physical Layer (PHY) Specifications,* IEEE Std. 802.11, 1999 Edition.

European Search Report

AT&T et al, "IEEE 802.11 QoS MAC Enhancements Joint Proposal", May 2000, pp. 1-50.

* cited by examiner

DEVICES, SOFTWARES AND METHODS FOR RESCHEDULING MULTI-PARTY SESSIONS UPON PREMATURE TERMINATION OF SESSION

CROSS REFERENCE TO RELATED APPLICATIONS

This application claims priority from U.S.A. Provisional Application No. 60/233,363, filed on Sep. 18, 2000, which is hereby incorporated by reference.

BACKGROUND OF THE INVENTION

1. Field of the Invention

The present invention is related to the field of wireless communications between devices that participate in forming a network, and more specifically to devices, softwares and methods for accelerating data exchanges in a wireless network even in the presence of hidden nodes.

2. Description of the Related Art

Local area networks (LANs) are increasingly used to transfer data. A relatively new application is wireless LANs, also known as WLANs. These can provide the benefits of a wired LAN, without requiring the different stations to be physically coupled to each other. There is no need for procuring transmission wires such as coaxial conductors, twisted prayers of wires, optical fibers, etc. for transferring the data. Instead, the data is transferred through space, either using radio frequency (RF) waves (that are also known as microwaves), or optical frequency waves, such as infrared (IR) light. A network may be formed by bringing components close together, without the need to plug transmission wires to them.

Radio based WLANs have several characteristics which differ from those of wired LANs. These characteristics include lower achievable data capacity, which is due to a number of factors, such as bandwidth limitations. That is why it is desirable to not waste time windows in such communications.

In addition, since many devices share the same medium, there can be problems if concurrent transmissions are permitted. These problems are discussed in more detail below.

Referring to FIG. 1, a network 110 includes a device 120 that operates as an Access Point (AP) 120 to network 120.

AP 120 may establish wireless concurrent communications with a first wireless station STA1 140 and a second wireless station STA2 150. This will mean establishing two communication links, namely link 145 with STA1 140 and link 155 with STA2 150.

Both links 145, 155 are within the same medium 165. It becomes apparent that there is a need to prevent peripheral stations STA1 140 and STA2 150 from transmitting simultaneously along links 145, 155 respectively. Concurrent transmission within the same medium 165 would, if permitted, corrupt the data being received by AP 120.

Concurrent transmission is typically avoided by forcing all devices to follow protocols. Many such protocols are being developed under the aegis of the Institute of Electrical and Electronic Engineers (IEEE), in terms of standard 802.11.

One protocol is for operation while in a Point Coordination Function (PCF). The protocol has AP 120 establishing a communication scheme after receiving requests from contending peripheral devices STA1 140, STA2 150. These are requests for reserving resources, such as bandwidth and memory, and are therefore also known as reservation requests.

Afterwards AP 120 processes the contending reservation requests, and resolves them. In other words, it generates a schedule for when each one of peripheral devices STA1 140, STA2 150 should transmit. Then AP 120 informs peripheral devices STA1 140, STA2 150 of the transmission schedule as follows.

Referring now to FIG. 2A, a diagram of pulses within medium 165 is shown. A time axis TM designates times of the events. Pulses shown above the time axis TM are those transmitted by AP 120, while those below axis TM are transmitted by devices STA1 140, STA2 150. Axis TM thus provides a coordinate of when pulses occur. As such, their lack of collision can be gauged, along with their overall efficiency.

AP 120 first transmits a scheduling pulse 220, which is also called a polling pulse. Scheduling pulse 220 includes a number of components, such as a header 222, a plan 224 to exchange data with station STA1 140 for a first time window of duration T1, a plan 226 to exchange data with station STA2 150 for a second time window of duration T2 shortly after time T1 expires, and a section 228 that may include a trailer, depending on the protocol. Section 228 may additionally include plans for exchanging data with other stations, etc.

In fact, since scheduling pulse 220 includes instructions for more than one peripheral, it is sometimes called a multi-polling frame. Even though only two peripheral devices STA1 140, STA2 150 are described, such is by example and not by limitation. The invention is not limited to just two peripheral stations, and this description is in fact extendible to more.

Both STA1 140, STA2 150 receive scheduling pulse 220. That informs each of them the time windows during which they are allowed to exchange data with AP 120.

The first device STA1 140 waits for a time interval TS. Time interval TS must be as short or shorter than the Short Inter Frame Space (SIFS) of the connection. This way the continuity will not be broken, and any other device that may want to contend for medium 165 will continue waiting.

Then first device STA1 140 exchanges data with AP 120, which is depicted as a pulse 245. While pulse 245 covers simultaneously both above and below axis TM, that does not mean there is concurrent transmission. During that time, STA1 140 and AP 120 are exchanging data, acknowledgement pulses (ACK), etc. This exchanging data lasts during the first time window. Its time duration T1 has been determined by AP 120, and learned from scheduling pulse 220.

Then, after another short time interval TS, the second device STA2 150 exchanges data with AP 120, which is depicted as a pulse 255. This exchanging data lasts during the second time window. Its duration T2 has been determined by AP 120, and learned from scheduling pulse 220.

Referring now to FIG. 2B, a variation is shown. Everything is the same, except the transmission of data from STA1 140 is labeled as pulse 247. Pulse 247 lasts for a time duration T11, which is less than the scheduled T1. In other words, the session of AP 120 with the first device STA1 140 terminates prematurely. This may happen if STA1 140 is a telephone that has not received all its data by the time it is to transmit.

In FIG. 2B, second device STA2 150 will initiate pulse 255 when the second time window is scheduled. This, however, leaves a quiet time window TQ.

Quiet time window TQ is merely wasted time at best. Worse, window TQ is larger than TQ or SIFS. This engenders the possibility that a device that has been brought close and seeks to establish a connection with AP 120 may interpret TQ as a time suitable for submitting a reservation request. This will break the continuity, and force rescheduling, which is inefficient. In the worst case, there could be collision.

Referring now to FIG. 2C, a solution to this problem is described, which has been proposed in a paper titled "IEEE 802.11 QoS MAC Enhancements—Joint Proposal", IEEE 802.11 Document No. 00/071, May 2000, by ATT, Lucent and Sharewave.

Briefly, it is proposed that the second time window is rescheduled to start immediately after pulse 247 concludes. Indeed, that it should happen after a time TS or equivalent. The advantage is that the whole session will finish faster. In addition, quiet time window TQ is eliminated, along with its potential problems.

The solution of FIG. 2C suffers from a problem, which this document labels a hidden node problem. Referring back to FIG. 1, there may be a physical obstruction 173, which prevents second device STA2 150 from sensing the transmissions of first device STA1 140. In other words, device STA1 140 is a node which is hidden from device STA2 150.

In that case, second device STA2 150 will not know when pulse 247 (of FIG. 2C) ends. It will not have enough information to reschedule, and will therefore assume that the entire window TQ will be occupied. Then the system will behave as in FIG. 2B, and the advantage will be lost.

BRIEF SUMMARY OF THE INVENTION

The present invention overcomes these problems and limitations of the prior art.

Generally, the present invention provides devices, softwares and methods for rescheduling multi-party sessions upon premature termination of a session, even in the presence of hidden nodes. The invention teaches for the Access Point to transmit a rescheduling frame, when the exchange of data with a hidden node finishes before schedule. Upon sensing the rescheduling frame, the second window is rescheduled.

Since it is transmitted from the Access Point, the rescheduling frame is sensed by all the peripherals, whether or not they are hidden from each other. This way time is not wasted, and quiet windows are not permitted to occur.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides devices, softwares and methods for accelerating data exchanges in a wireless network even in the presence of hidden nodes. The present invention is now described in more detail.

Figure 1:
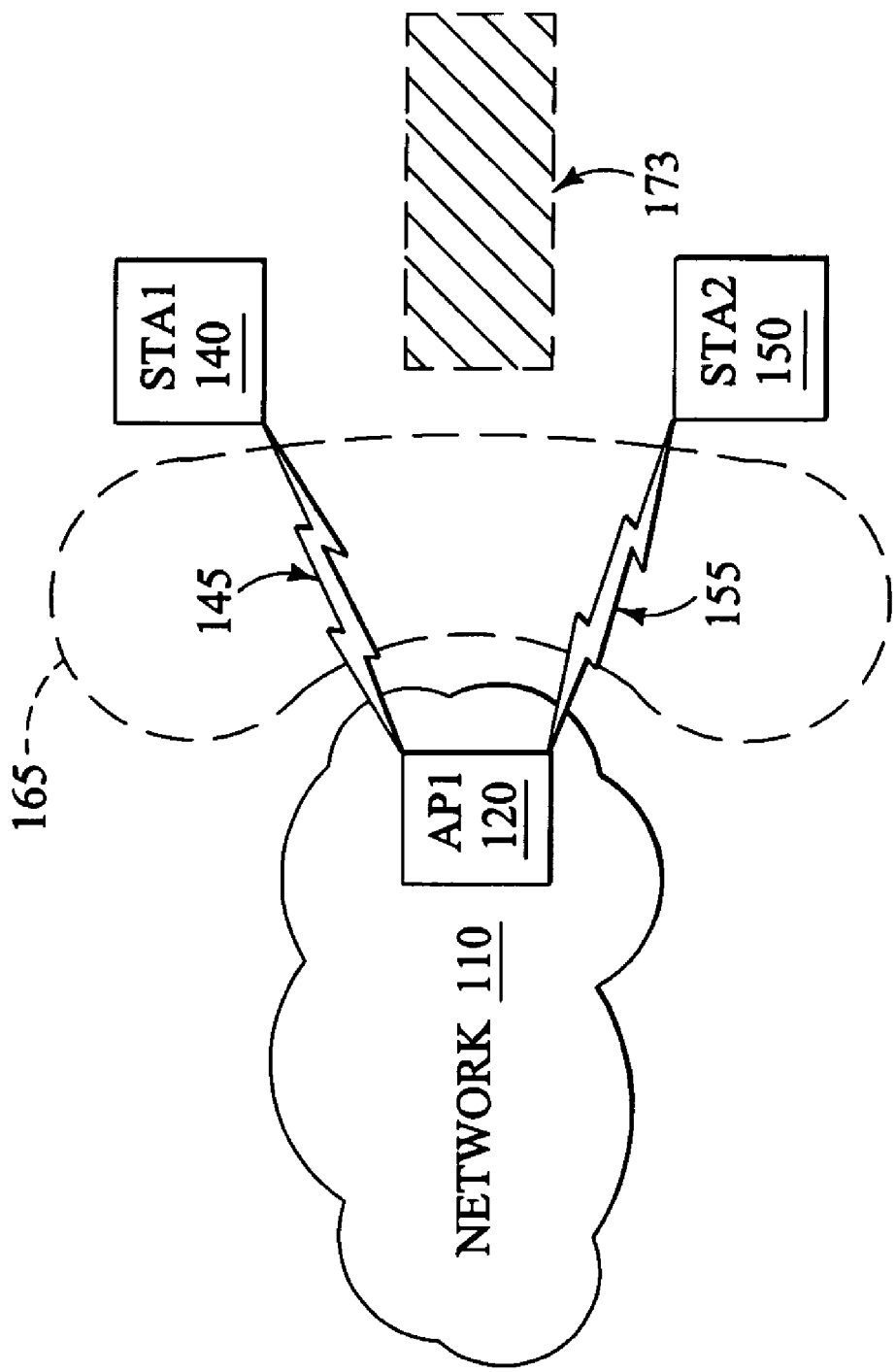
FIG. 1 is a diagram of an arrangement for illustrating a problem in the prior art.
Figures 2A, 2B, 2C:
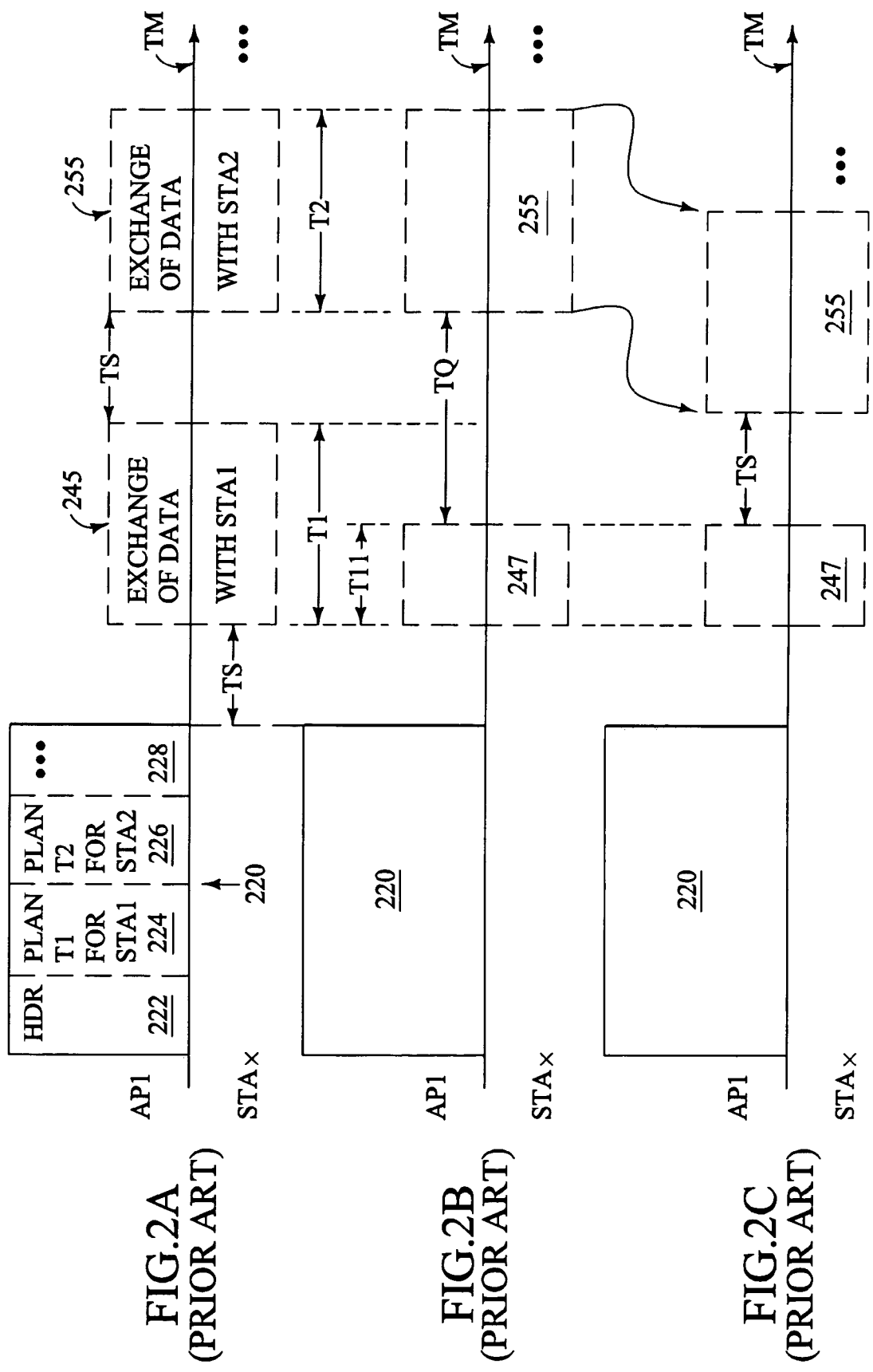
FIG. 2A is a timing diagram of pulses exchanging data between devices of FIG. 1 according to a known protocol.
FIG. 2B is a diagram showing a variation of FIG. 1, where one of the devices finishes a transmission ahead of schedule.
FIG. 2C is a diagram showing a variation of FIG. 2B, which is more efficient than FIG. 2B.
Figure 3:
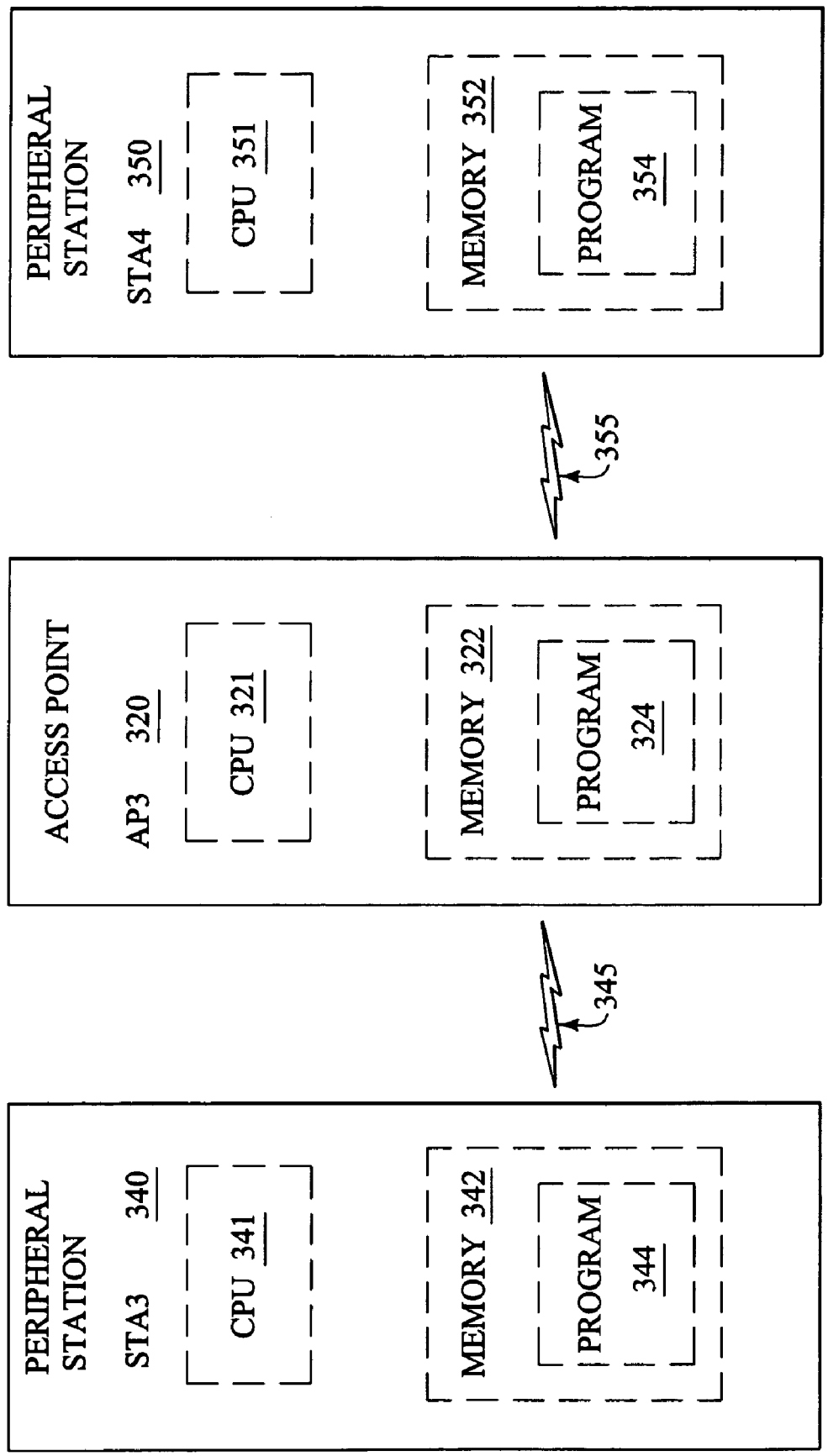
FIG. 3 is a block diagram of an Access Point AP3 made according to an embodiment of the invention, and two peripheral stations STA3, STA4 made according to embodiments of the invention.

Referring now to FIG. 3, an Access Point device AP3 320 made according to an embodiment of the invention is described in more detail. Device may be any access point device, standalone or to a network (not shown in FIG. 3).

Device AP3 320 has a processor 321, which may be implemented as a Digital Signal Processor (DSP), Central Processing Unit (CPU), or any other equivalent way known in the art. Device AP3 320 additionally includes a memory 322, on which a program 324 may reside. Functions of processor 321 may be controlled by program 324, as will become apparent from the below.

Continuing to refer to FIG. 3, a peripheral device STA3 340 made according to an embodiment of the invention is described in more detail. Device STA3 340 may be any peripheral device that may establish a wireless communication connection 345 with AP 320.

Device STA3 340 has a processor 341, which may be implemented as a Digital Signal Processor (DSP), Central Processing Unit (CPU), or any other equivalent way known in the art. Device STA3 340 additionally includes a memory 342, on which a program 344 may reside. Functions of processor 341 may be controlled by program 344, as will become apparent from the below.

Continuing to refer to FIG. 3, a peripheral device STA4 350 made according to an embodiment of the invention is described in more detail. Device STA4 350 may be any peripheral device that may establish a wireless communication connection 355 with AP 320.

Device STA4 350 has a processor 351, which may be implemented as a Digital Signal Processor (DSP), Central Processing Unit (CPU), or any other equivalent way known in the art. Device STA4 350 additionally includes a memory 352, on which a program 354 may reside. Functions of processor 351 may be controlled by program 354, as will become apparent from the below.

Figure 4:
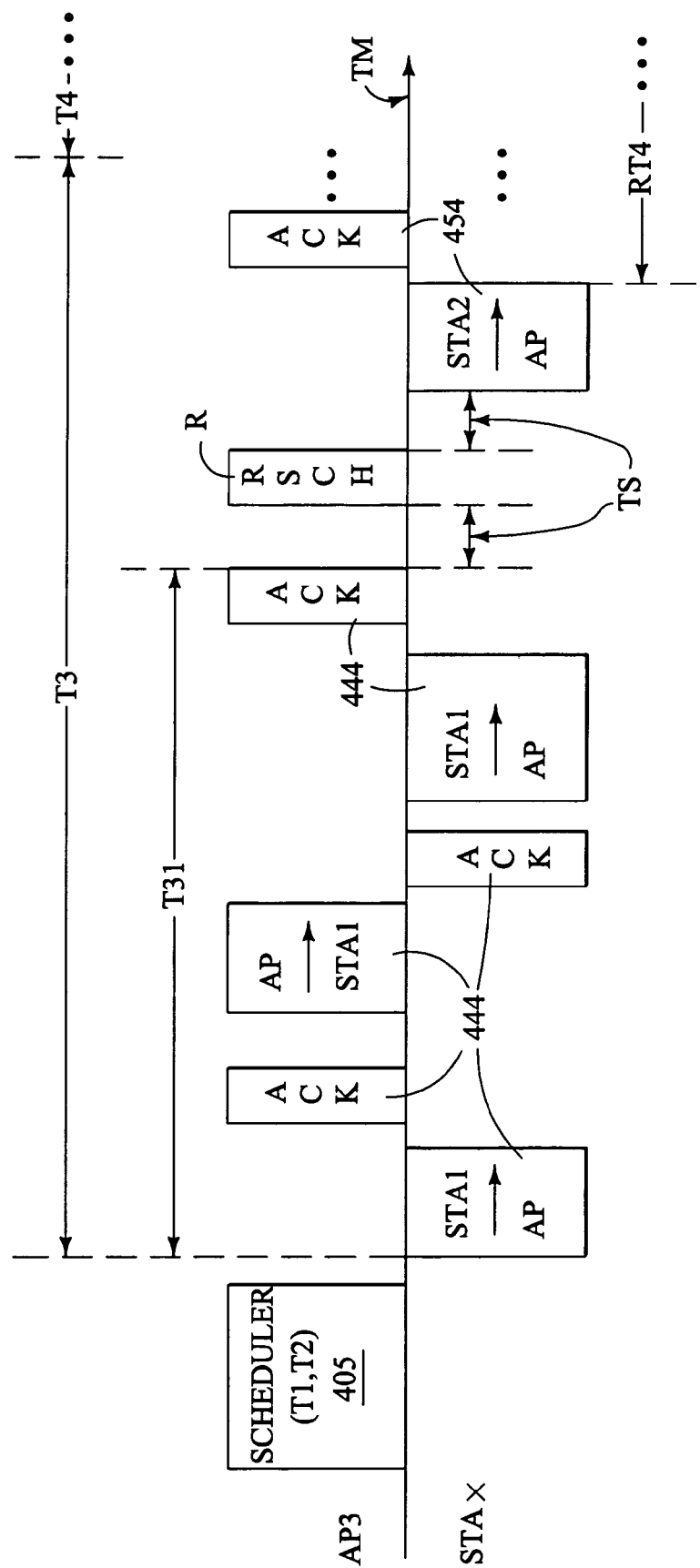
FIG. 4 is a timing diagram of pulses exchanging data between devices of FIG. 3 according to an embodiment of the present invention.

Referring now to FIG. 4, a timing diagram is shown for the devices of FIG. 3. AP3 320 transmits a scheduler pulse 405, which is also known as a multi-polling pulse, a multi-poll frame, etc. Pulse 405 is received by both peripherals STA3 340 and STA 350, which decode a first scheduled time window of duration T3, and a second scheduled time window of duration T4. The second time window is to occur after the first time window is concluded. Device STA3 340 is to exchange data only during the first time window, while device STA4 350 is to wait. Then device STA4 350 is to exchange data only during the second time window, while device STA3 340 is to wait.

Indeed, device STA3 340 exchanges signals 444 with AP 320. The exchange lasts for a time duration T31, which is shorter than the allotted duration T3. The shortfall maybe for a number of reasons, such as data not arriving to device STA3 340 in time for retransmission.

Detecting the earlier finish, device AP3 320 transmits a rescheduling pulse R. Preferably the rescheduling pulse R is transmitted within time TS, such as within a SIFS.

Rescheduling pulse R need be very short, such as a null frame. The advantage is that all peripheral devices STA3 340, STA4 350 will receive it, even if they are hidden from each other.

By convention, the rescheduling frame signals a rescheduling of the time windows. In particular, that the first time window ends at the time T31. And that the second time window is no longer to occur during time T4 on axis TM, but during Rescheduled Time RT4. It will be noted that the second time window is thus advanced. It leaves no quiet times, which therefore does not allow the opportunity to disrupt the initially scheduled flow of exchanges.

It is advantageous that the rescheduled second time window start immediately after the rescheduling pulse. In other words, that RT4 start at a time TS after the rescheduling pulse R.

During the rescheduled second time window, the second peripheral device STA4 350 exchanges pulses 454 with AP 320. It should be noted that this is within the first time window as was originally scheduled.

Figures 5A, 5B:
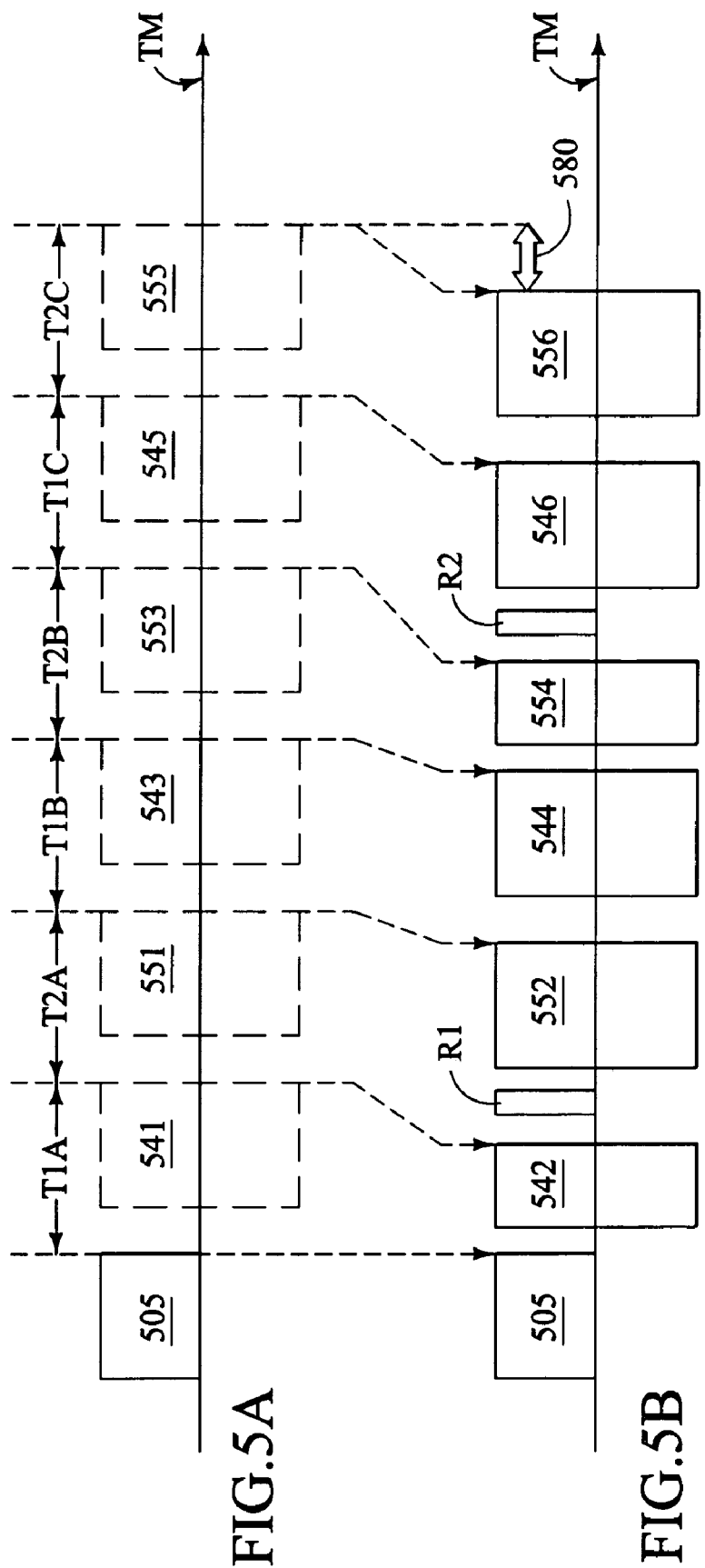
FIG. 5A is an originally scheduled timing diagram of pulses exchanging data between devices of FIG. 3 according to another embodiment of the present invention.
FIG. 5B is the actual timing diagram of FIG. 5A, resulting from the invention.

Referring now to FIG. 5A and FIG. 5B, an expanded embodiment of the invention is described. It will be appreciated that the scale in FIG. 5A and FIG. 5B is larger than that in FIG. 4.

In FIG. 5A, a multi-poll pulse 505 is transmitted. Pulse 505 may be a schedule frame CF, which includes periodicity information as will be understood from the below.

Pulse 505 is received by STA3 340 and STA3 350, and decoded as follows. STA3 340 will have the opportunity to exchange data during windows 541, 543, 545, which will have durations T1A, T1B, T1C, respectively. And STA4 350 will have the opportunity to exchange data during windows 551, 553, 555, which will have durations T2A, T2B, T2C, respectively. The originally scheduled time windows 541, 543, 545, 551, 553, 555 are shown in dashed lines, prior to actual implementation. Their periodicity was also decoded from pulse 505.

FIG. 5B is the actual timing diagram of FIG. 5A, resulting from the invention. The effects of the invention are shown in the form of rescheduling. In the preferred form, the rescheduling is by advancing all schedules uniformly where the exchanges stop short of the scheduled time.

More particularly, scheduled time windows 541, 543, 545 become implemented as rescheduled time windows 542, 544, 546, respectively, on time axis TM. The duration of rescheduled window 542 is shorter than the scheduled corresponding window 541. Accordingly, window 542 is followed by rescheduling pulse R1. The durations of rescheduled windows 544, 546 are equal to the corresponding scheduled windows 543, 545, except they occur faster than scheduled, thanks to the rescheduling.

In addition, scheduled time windows 551, 553, 555 become implemented as rescheduled time windows 552, 554, 556, respectively, on time axis TM. The duration of rescheduled window 554 is shorter than the scheduled corresponding window 553. Accordingly, window 554 is followed by rescheduling pulse R2. The durations of rescheduled windows 552, 556 are equal to the corresponding scheduled windows, except they occur faster, thanks to the rescheduling.

It will be appreciated that rescheduling may happen after a session with either the first device or the second device. Labels given in this document such as first and second are interchangeable.

The combined effect of rescheduling pulses R1, R2 can be seen in FIG. 5B. The last pulse 556 finishes a time duration 580 ahead of schedule.

It is readily apparent that the present invention may be implemented by one or more devices that include logic circuitry. It may also be implemented by a device that includes a dedicated processor system, which may include a microcontroller or a microprocessor.

The invention additionally provides methods, which are described below. Moreover, the invention provides apparatus that performs, or assists in performing the methods of the invention. This apparatus may be specially constructed for the required purposes, or it may comprise a general-purpose computer selectively activated or reconfigured by a computer program stored in the computer. The methods and algorithms presented herein are not necessarily inherently related to any particular computer or other apparatus. In particular, various general-purpose machines may be used with programs in accordance with the teachings herein, or it may prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself The present invention relates also to method steps for operating a computer and for processing electrical or other physical signals to generate other desired physical signals.

The invention additionally provides a program, and a method of operation of the program. The program is most advantageously implemented as a program for a computing machine, such as a general-purpose computer, a special purpose computer, a microprocessor, etc.

The invention also provides a storage medium that has the program of the invention stored thereon. The storage medium is a computer-readable medium, such as a memory, and is read by the computing machine mentioned above.

A program is generally defined as a sequence of steps leading to a desired result. These steps, also known as instructions, are those requiring physical manipulations of physical quantities. Usually, though not necessarily, these quantities take the form of electrical or magnetic signals capable of being stored, transferred, combined, compared, and otherwise manipulated or processed. When stored, they may be stored in any computer-readable medium. It is convenient at times, principally for reasons of common usage, to refer to these signals as bits, data bits, samples, values, elements, symbols, characters, images, terms, numbers, or the like. It should be borne in mind, however, that all of these and similar terms are associated with the appropriate physical quantities, and that these terms are merely convenient labels applied to these physical quantities.

This detailed description is presented largely in terms of flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming may use this description to readily generate specific instructions for implementing a program according to the present invention. For the sake of economy, however, flowcharts used to describe methods of the invention are not repeated in this document for describing software according to the invention.

Often, for the sake of convenience only, it is preferred to implement and describe a program as various interconnected distinct software modules or features, collectively also known as software. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

In the present case, methods of the invention are implemented by machine operations. In other words, embodiments of the program of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Figure 6:
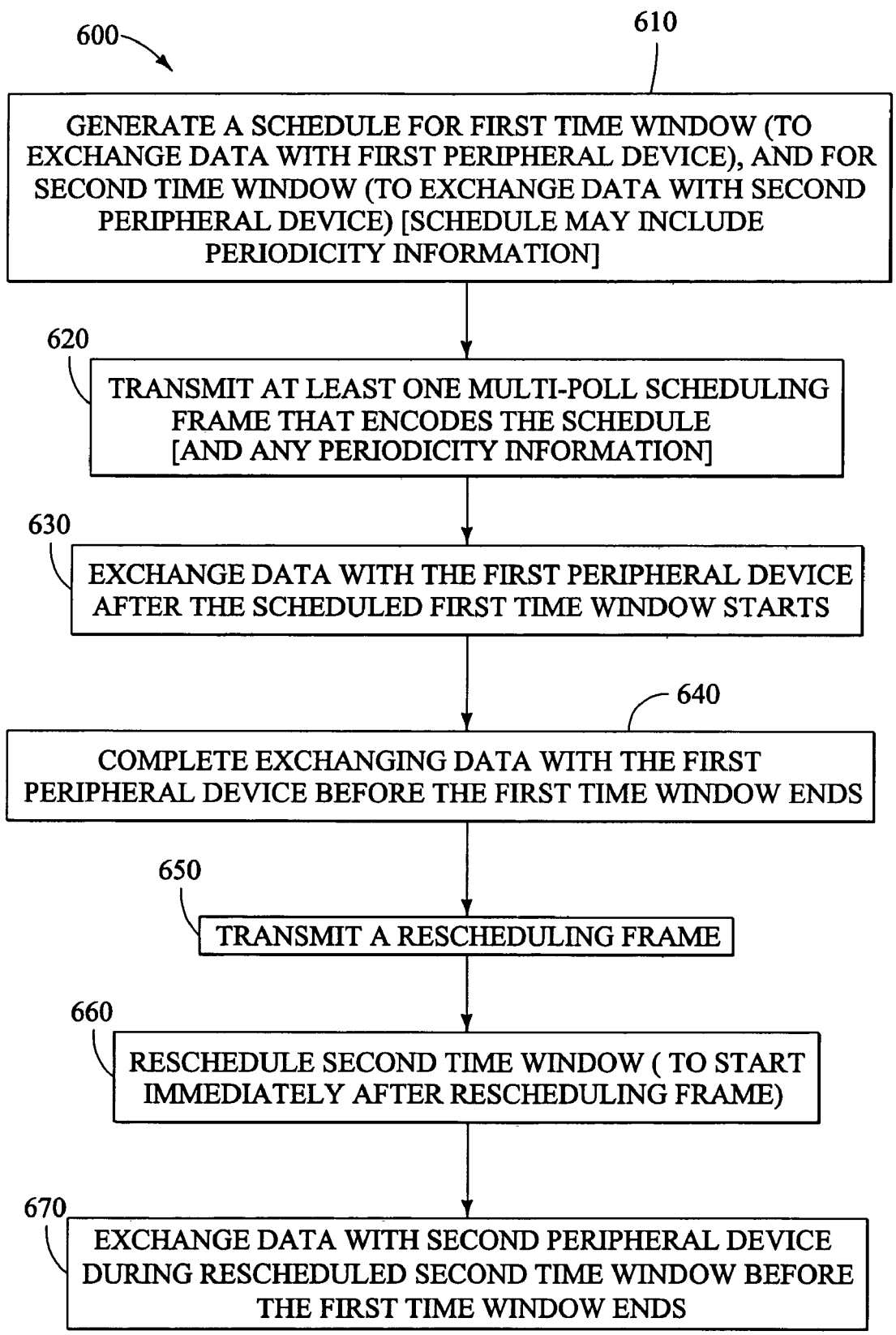
FIG. 6 is a flowchart illustrating a method of operation of an access point according to an embodiment of the present invention.

Referring now to FIG. 6, a flowchart 600 is used to illustrate a method according to an embodiment of the invention. The method of flowchart 600 may be practiced by an Access Point device.

According to a box 610, a schedule is generated for a first time window (to have a session of exchange data with a first peripheral device), and for second time window (to have a session for exchanging data with a second peripheral device). The schedule may include periodicity information.

According to a next box 620, at least one multi-poll scheduling frame is transmitted that encodes the schedule. It also encodes any periodicity information.

According to a next box 630, data is exchanged with the first peripheral device, after the scheduled first time window starts.

According to a next box 640, exchanging data with the first peripheral device is completed before the first time window ends.

According to a next box 650, a rescheduling frame is transmitted. It is preferably a null frame, given that it occupies the least time.

According to an optional next box 660, a second time window is rescheduled. In the preferred embodiment, it is rescheduled to start immediately after rescheduling frame. This will guarantee the maximum time savings, along with no prolonged quiet time.

According to a next box 670, data is exchanged with a second peripheral device during rescheduled second time window. This starts before the first time window ends.

Figure 7:
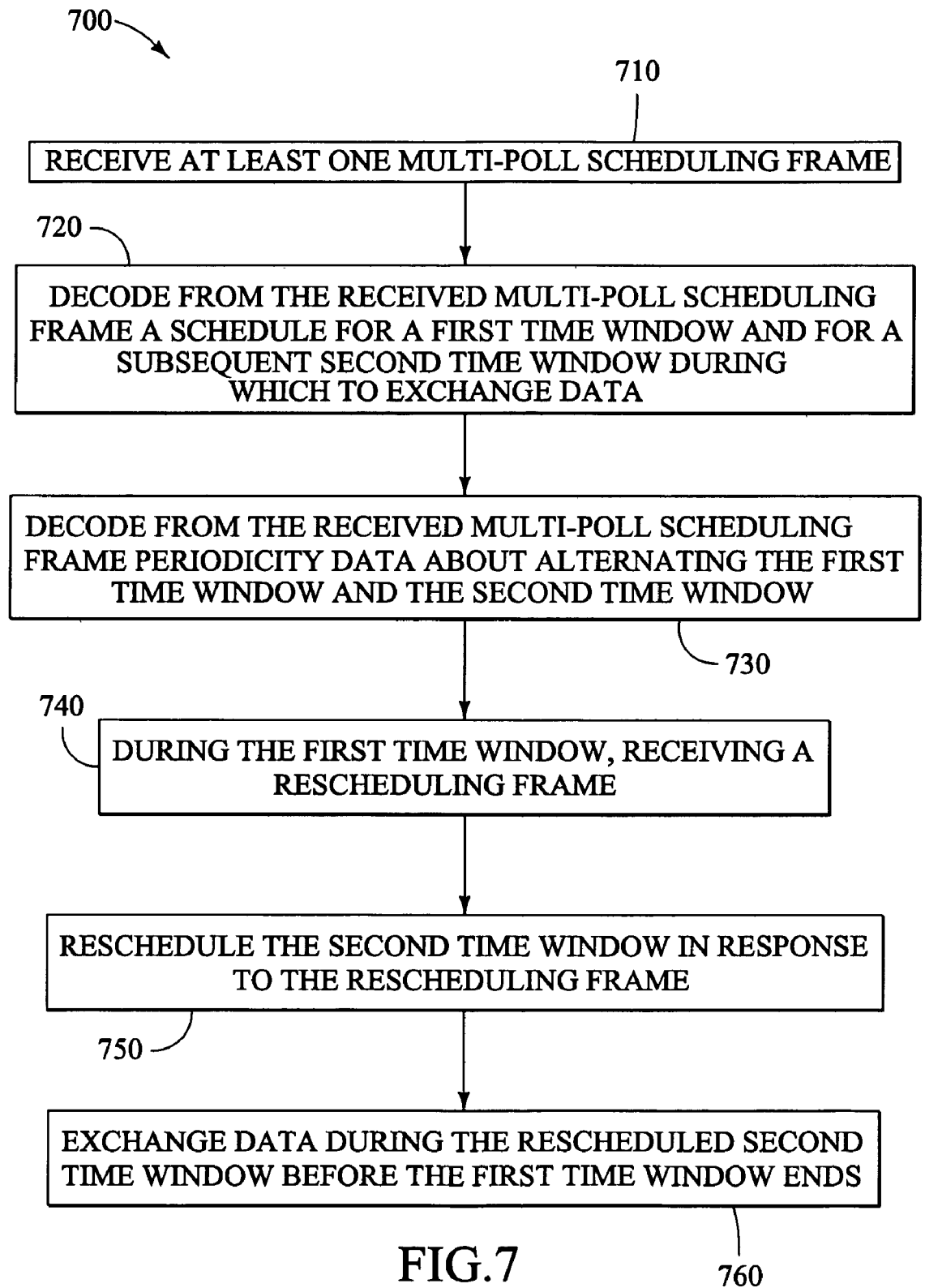
FIG. 7 is a flowchart illustrating a method of operation of a station according to an embodiment of the present invention.

Referring now to FIG. 7, a flowchart 700 is used to illustrate a method according to another embodiment of the invention. The method of flowchart 700 may be practiced by a peripheral station in a wireless communication scheme.

According to a box 710, at least one multi-poll scheduling frame is received.

According to a next box 720, a schedule is decoded from the received multi-poll scheduling frame. The schedule is for a first time window and for a subsequent second time window during which to exchange data.

According to an optional next box 730, periodicity data is decoded from the received multi-poll scheduling frame. The periodicity data is about alternating the first time window and the second time window.

According to a next box 740, a rescheduling frame is received during the first time window. This may be by convention a null frame.

According to an optional next box 750, the second time window is rescheduled in response to the rescheduling frame. Preferably it is rescheduled to start immediately, while waiting only for a SIFS.

According to an optional next box 760, data is exchanged during the rescheduled second time window before the first time window ends.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A device comprising:

a memory; and a processor coupled with the memory, the processor adapted to:

receive a reservation request from a first peripheral device for a wireless communication session between the first peripheral device and the processor;

receive another reservation request from a second peripheral device for another wireless communication session between the second peripheral device and the processor;

generate a schedule in response to the reservation request and the another reservation request, the schedule coordinating the wireless communication session during a first time window having a designated start time and a designated end time, the schedule coordinating the another wireless communication session to begin after the designated end time;

wirelessly transmit a multi-poll scheduling frame to the first peripheral device and the second peripheral device, the schedule encoded in the multi-poll scheduling frame;

wirelessly exchange data with the first peripheral device during the first time window;

wirelessly transmit a rescheduling frame in response to the wireless data exchange with the first peripheral device completing before the designated end time occurs, the rescheduling frame dynamically enabling the second peripheral device to begin the another wireless communication session before the designated end time, where the rescheduling frame is transmitted only if the data exchange with the first peripheral device is completed before the designated end time, and not transmitted at other times; and wirelessly exchange data with the second peripheral device before the first time window ends pursuant to the rescheduling frame wherein the schedule provides for exchanging data with only the second peripheral device during a second time window, the second time window alternating with the first time window according to a periodicity; and wherein the processor is further adapted to encode data about the periodicity in the multi-poll scheduling frame.

2. The device of claim 1, wherein the rescheduling frame is a null frame.

3. A device comprising:

a memory; and a processor coupled with the memory, the processor adapted to wirelessly transmit a reservation request to a first device for wireless communications with the first device, wirelessly receive a multi-poll scheduling frame, decode from the multi-poll scheduling frame a schedule for wireless communications, the schedule specifying a start time and an end time for a first time window, the schedule specifying a start time and an end time for a second time window, the second time window after and not overlapping the first time window, the first time window for data exchange between the first device and a second device, the second time window for data exchange between the first device and the device, during the first time window, wirelessly receive a rescheduling frame from the first device, where the rescheduling frame is received only if the data exchange between the first device and the second device is completed before the end time of the first time window, and not received at other times, in response to the rescheduling frame, dynamically reset the start time of the second time window to begin before the end time of the first time window, and before the end time of the first time window, wirelessly exchange data with the first device decode from the received multi-poll scheduling frame periodicity data about alternating the first time window and the second time window.

4. The device of claim 3, wherein the second time window is rescheduled to start immediately after the rescheduling frame.

5. The device of claim 3, wherein the rescheduling frame is a null frame.

6. An article comprising: a storage medium, said storage medium having stored thereon instructions, that, when executed by at least one device, result in:

generating a schedule for wirelessly exchanging data during a wireless communication session with a first peripheral device during a first time window, and for wirelessly exchanging data with a second peripheral device after the first time window, the schedule generated in response to a request for the wireless communication session from the first peripheral device and in response to another request for another wireless communication session from the second peripheral device;

wirelessly transmitting at least one multi-poll scheduling frame that encodes the schedule, the multi-poll scheduling frame containing instructions for the first peripheral device and the second peripheral device;

wirelessly exchanging data with the first peripheral device after the scheduled first time window starts;

completing wirelessly exchanging data with the first peripheral device before the first time window ends;

wirelessly transmitting a rescheduling frame to the second peripheral device that dynamically during the same wireless communication session enables the second peripheral device to start wirelessly exchanging data before the end of the first time window, where the rescheduling frame is transmitted only if the data exchange with the first peripheral device is completed before the end time of the first time window ends, and not transmitted at other times; and wirelessly exchanging data with the second peripheral device before the first time window ends, wherein the generated schedule provides for exchanging data with only the second peripheral device during a second time window, and that the second time window alternate with the first time window according to a periodicity, and the instructions further result in:

encoding data about the periodicity in the multi-poll scheduling frame.

7. The article of claim 6, wherein the rescheduling frame is a null frame.

8. An article comprising a storage medium, said storage medium having stored thereon instructions, that, when executed by a first wireless device, result in:

wirelessly transmitting a reservation request for a wireless communication session with a second wireless device;

wirelessly receiving a multi-poll scheduling frame, the multi-poll scheduling frame including instructions for the first wireless device and a third wireless device;

decoding from the received multi-poll scheduling frame a schedule, the schedule identifying a start time and a stop time of a first time window for wireless communication between the second wireless device and the third wireless device, the schedule identifying a start time and a stop time of a second time window for wireless communication between the second wireless device and the first wireless device, the start time for the second time window scheduled after the stop time for the first time window;

in response to receiving a rescheduling frame during the first time window, the rescheduling frame directing the start time for the second time window to begin before the stop time for the first time window, dynamically rescheduling the start time for the second time window to occur prior to the stop time for the first time window, where the rescheduling frame is received only if the wireless communication during the first time window ends before the stop time for the first time window, and not received at other times; and wirelessly exchanging data with the second wireless device before the stop time for the first time window;

decoding from the received multi-poll scheduling frame periodicity data about alternating the first time window and the second time window.

9. The article of claim 8, wherein the second time window is rescheduled to start immediately after the rescheduling frame.

10. The article of claim 8, wherein the rescheduling frame is a null frame.

11. A method comprising:

receiving reservation requests from a first peripheral device and a second peripheral device;

generating a schedule that specifies a start time for a first time window, a stop time for the first time window, and a start time for a second time window, the first time window for wirelessly receiving a first data transmission from the first peripheral device, the second time window for wirelessly receiving a second data transmission from the second peripheral device, the start time of the second time window occurring after the stop time of the first time window;

wirelessly transmitting a multi-poll scheduling frame that encodes the schedule, the multi-poll scheduling frame containing instructions for the first peripheral device and for the second peripheral device;

wirelessly receiving the first data transmission during the first time window, the first data transmission completing before the stop time of the first time window;

wirelessly transmitting a rescheduling frame that directs the second peripheral device to begin the second data transmission before the stop time for the first time window, where the rescheduling frame is transmitted only if the first data transmission is completed before the stop time of the first time window, and not transmitted at other times; and wirelessly receiving a portion of the second data transmission during the first time window;

exchanging data with only the second peripheral device during a second time window according to the schedule;

alternating the second time window with the first time window according to a periodicity; and encoding data about the periodicity in the multi-poll scheduling frame.

12. The method of claim 11, wherein the rescheduling frame is a null frame.

13. A method comprising:

wirelessly transmitting a reservation request for a wireless communication session to an access point;

wirelessly receiving a multi-poll scheduling frame associated with the wireless communication session;

decoding from the received multi-poll scheduling frame a schedule for a first time window during which to wirelessly exchange data between the access point and a first wireless device and for a second time window during which to wirelessly exchange data between the access point and a second wireless device, the second time window occurring after the first time window and not overlapping the first time window, the schedule specifying a start time and an end time for the first time window and the second time window;

during the first time window, wirelessly receiving a rescheduling frame, where the rescheduling frame is received only if the start time of the second time window is to be rescheduled before the end time of the first time window, and not at other times;

in response to the rescheduling frame, rescheduling the start time of the second time window to occur before the end time of the first time window; and wirelessly exchanging data before the first time window ends;

decoding from the received multi-roll scheduling frame periodicity data about alternating the first time window and the second time window.

14. The method of claim 13, wherein the second time window is rescheduled to start immediately after the rescheduling frame.

15. The method of claim 13, wherein the rescheduling frame is a null frame.

* * * * *

UNITED STATES PATENT AND TRADEMARK OFFICE
CERTIFICATE OF CORRECTION

PATENT NO. : 7,330,877 B2
APPLICATION NO. : 09/823511
DATED : February 12, 2008
INVENTOR(S) : Srinivas Kandala Page 1 of 1

It is certified that error appears in the above-identified patent and that said Letters Patent is hereby corrected as shown below:

At column 12, line 33, please replace "multi-roll" with --multi-poll--

Signed and Sealed this

Seventeenth Day of February, 2009

JOHN DOLL
*Acting Director of the United States Patent and Trademark Office*